(12) United States Patent
Xu et al.

(10) Patent No.: US 10,720,806 B2
(45) Date of Patent: Jul. 21, 2020

(54) ROTOR STRUCTURE FOR ELECTRIC MACHINE ASSEMBLY

(71) Applicant: Ford Global Technologies, LLC, Dearborn, MI (US)

(72) Inventors: Wei Xu, Canton, MI (US); Zhichun Ma, Ann Arbor, MI (US); Shuzhen Liu, Novi, MI (US); Jiyao Wang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 432 days.

(21) Appl. No.: 15/625,155

(22) Filed: Jun. 16, 2017

(65) Prior Publication Data

US 2018/0367004 A1 Dec. 20, 2018

(51) Int. Cl.
*H02K 1/27* (2006.01)
*B60K 6/48* (2007.10)
*B60L 50/50* (2019.01)
*H02K 1/30* (2006.01)
*B60K 6/26* (2007.10)

(52) U.S. Cl.
CPC ............... *H02K 1/276* (2013.01); *B60K 6/26* (2013.01); *B60K 6/48* (2013.01); *B60L 50/50* (2019.02); *H02K 1/2766* (2013.01); *H02K 1/30* (2013.01); *B60L 2220/14* (2013.01); *B60L 2220/16* (2013.01); *B60L 2220/50* (2013.01); *B60Y 2200/91* (2013.01); *B60Y 2200/92* (2013.01); *B60Y 2400/60* (2013.01); *Y10S 903/906* (2013.01)

(58) Field of Classification Search
CPC ......................................... H02K 1/2409–1/278
See application file for complete search history.

(56) References Cited

U.S. PATENT DOCUMENTS

| 8,487,495 | B2 | 7/2013 | Takizawa |
| 8,546,990 | B2 | 10/2013 | Suzuki et al. |
| 2016/0233748 | A1* | 8/2016 | Matsunaga ............ H02K 15/03 |

FOREIGN PATENT DOCUMENTS

| CN | 104767338 A1 | 7/2015 |
| JP | 2015119547 A1 | 6/2015 |

* cited by examiner

*Primary Examiner* — Ramon M Barrera
(74) *Attorney, Agent, or Firm* — David Kelley; Brooks Kushman P.C.

(57) ABSTRACT

An electric machine assembly for a vehicle is provided. The electric machine is in operational communication with a traction battery and includes a stator core defining a cavity and a rotor disposed within the cavity having an inner region defined by sets of triangle-shaped holes tessellated about respective central regions to form a truss structure such that the holes of the truss structure, during operational rotation, do not influence magnetic flux paths generated by magnets of the rotor. The rotor may have a strain energy value less than or equal to 16,100 Joules. The truss structure may include pairs of symmetrical portions each including segments arranged with adjacent rotor portions to define the triangle-shaped holes.

11 Claims, 6 Drawing Sheets

ROTOR STRUCTURE FOR ELECTRIC MACHINE ASSEMBLY

TECHNICAL FIELD

The present disclosure relates to a rotor for an electric machine assembly of an electrified vehicle.

BACKGROUND

Extended drive range technology for electrified vehicles, such as battery electric vehicles ("BEVs") and plug in hybrid vehicles ("PHEVs"), is continuously improving. Achieving these increased ranges, however, often requires traction batteries and electric machines to have higher power outputs and associated thermal management systems with increased capacities in comparison to previous BEVs and PHEVs. Improving weight and stiffness characteristics of rotors of electric machines may increase power outputs and vehicle performance.

SUMMARY

A vehicle includes a traction battery and an electric machine. The electric machine is in operational communication with the traction battery and includes a stator core defining a cavity and a rotor disposed within the cavity having an inner region defined by sets of triangle-shaped holes tessellated about respective central regions to form a truss structure such that the holes of the truss structure, during operational rotation, do not influence magnetic flux paths generated by magnets of the rotor. The rotor may have a strain energy value less than or equal to 16,100 Joules. The truss structure may include pairs of symmetrical portions each including segments arranged with adjacent rotor portions to define the triangle-shaped holes. The segments may include a first segment shared by each of the pair of symmetrical portions, a second segment, a third segment, a fourth segment, and a side segment. Each of the first segments may be arranged with one of the second segments and an adjacent portion of the rotor to define first and second triangle-shaped holes. Each of the second segments may be arranged with one of the third segments and a portion of one of the side segments to define third and fourth triangle-shaped holes. Each of the third segments may be arranged with one of the fourth segments and another portion of one of the side segments to define fifth and sixth triangle-shaped holes. The fourth segments and a base portion of the symmetrical portions may be arranged with one another to define a seventh triangle-shaped hole. The first segment may extend to the base portion of one of the pair of symmetrical portions to bisect the seventh triangle-shaped hole into two separate holes. The triangle-shaped holes may be arranged with one another so that a strain energy of the rotor is equal to or less than 16,100 Joules.

An electric machine assembly includes a stator core and a rotor. The stator core defines a cavity. The rotor is disposed within the cavity and includes a plurality of sectors spaced radially about a rotor central through-hole. Each of the plurality of sectors includes no more than two magnet openings to receive magnets oriented in a V shape and a truss structure including a plurality of triangle-shaped holes defined by members each having an end at a central region of the triangle-shaped holes to form a starburst pattern emanating from the central region. The truss structure may include first and second symmetrical portions. Each symmetrical portion may share a first member and each symmetrical portion may include second and third members. The first member may be arranged with each of the second members and an adjacent portion of the rotor to define first and second triangle-shaped holes. Each of the second members may be arranged with one of the third members and another adjacent portion of the rotor to define third and fourth triangle-shaped holes. Each of the third members and a base segment of one of the first and second symmetrical portions may be arranged with one another to define a fifth triangle-shaped hole therebetween. The first member may extend to the base segments of each of the first and second symmetrical portions to bisect the fifth triangle-shaped hole. The first member may define a central axis extending between a pair of magnets mounted within the two magnet openings.

An electric machine assembly includes a stator core and a rotor. The stator core defines a cavity. The rotor is disposed within the cavity and includes an inner region having a truss structure and an outer region for mounting magnets thereto and spaced radially from the inner region. The truss structure is sized such that the rotor has a strain energy value of approximately 16,000 Joules and a weight of approximately 6.35 kilograms. The truss structure may define a radial length of approximately fifty-four millimeters. The truss structure may include first and second symmetrical portions. Each symmetrical portion may share a first segment and each symmetrical portion may include a second segment, a third segment, and a fourth segment. The first segment may be arranged with each of the second segments and an adjacent portion of the rotor to define first and second triangle-shaped openings. Each of the second segments may be arranged with one of the third segments and another adjacent portion of the rotor to define third and fourth triangle-shaped openings. Each of the third segments may be arranged with one of the fourth segments and yet another adjacent portion of the rotor to define fifth and sixth triangle-shaped openings. The fourth segments may be arranged with a base portion of the symmetrical portions to define a seventh triangle-shaped opening. Each of the segments may define a width of three millimeters to seven millimeters and the rotor may define a diameter of one hundred ten millimeters to two hundred thirty millimeters. The first segment may extend to the base portion of a respective symmetrical portion to bisect the seventh triangle-shaped opening. The truss structure may include first and second symmetrical portions. Each symmetrical portion may share a first segment and each symmetrical portion may include a second segment and a third segment. The first segment may be arranged with each of the second segments and an adjacent portion of the rotor to define first and second triangle-shaped openings. Each of the second segments and third segments may be arranged with another adjacent portion of the rotor to define third and fourth triangle-shaped openings. Each of the third segments and a base portion of a respective symmetrical portion may be arranged with one another to define a fifth triangle-shaped opening therebetween.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
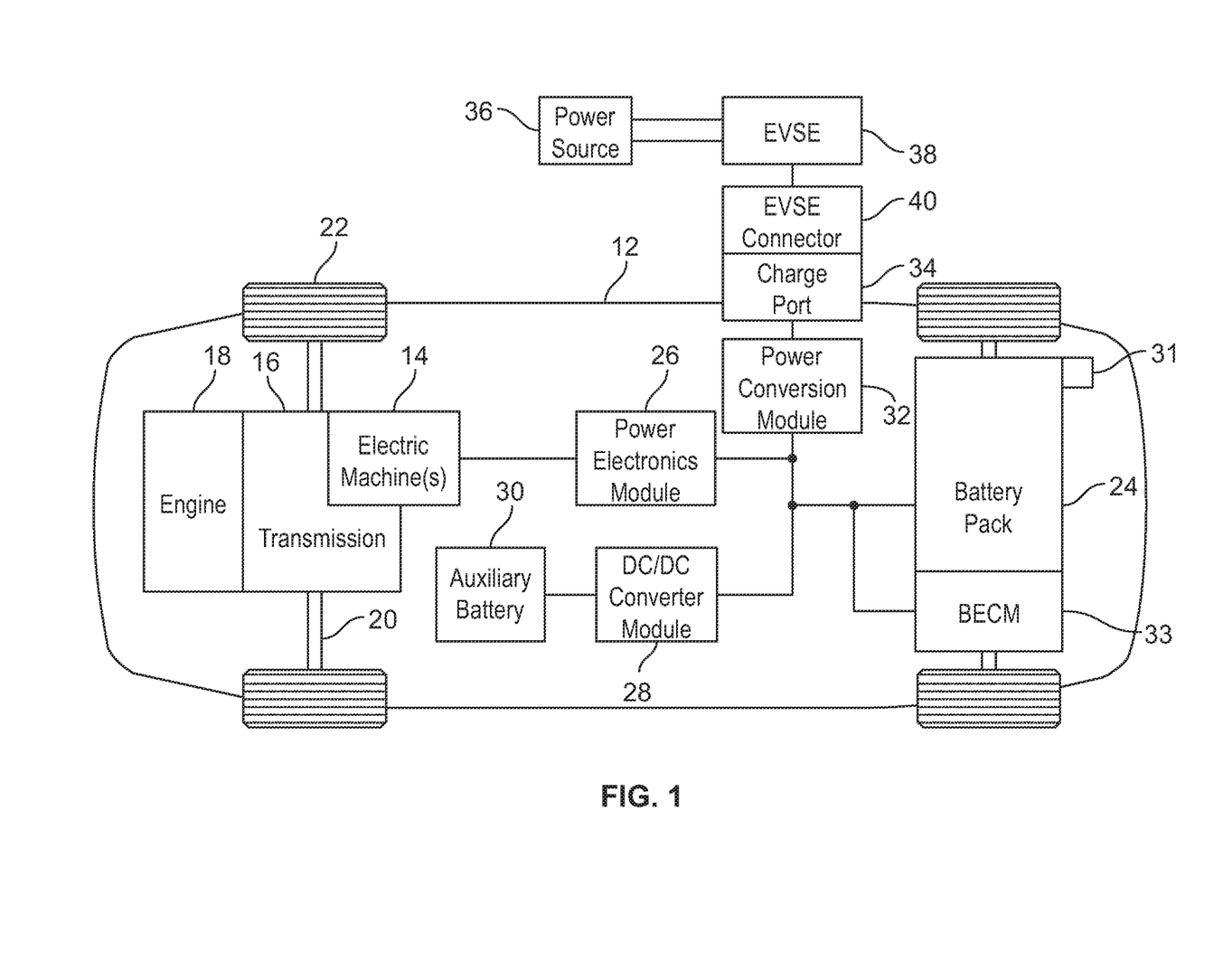
FIG. 1 is a schematic diagram illustrating an example of an electrified vehicle.

FIG. 1 depicts a schematic representation of an example of an electrified vehicle. In this example, the electrified vehicle is a PHEV referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

The battery cells of the traction battery 24, such as a prismatic or pouch-type cell, may include electrochemical elements that convert stored chemical energy to electrical energy. Prismatic cells or pouch-type cells may include a housing, a positive electrode (cathode) and a negative electrode (anode). An electrolyte may allow ions to move between the anode and cathode during a discharge operation, and then return during a recharge operation. Terminals may allow current to flow out of the battery cells for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Figure 2:
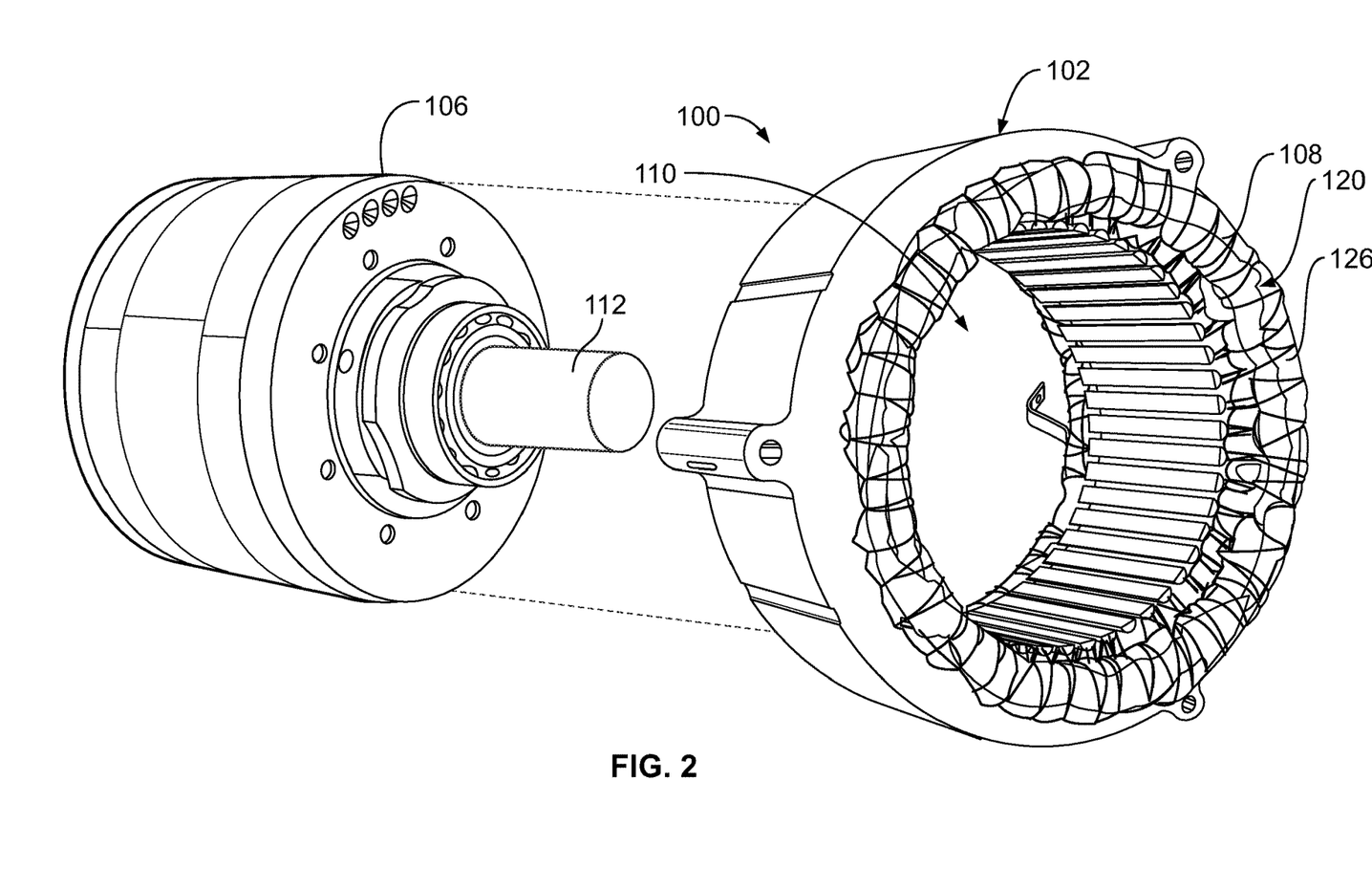
FIG. 2 is a perspective, exploded view of an example of a portion of an electric machine.

FIG. 2 shows a partially exploded view of an example of portions of an electric machine for an electrified vehicle, referred to generally as an electric machine 100 herein. The electric machine may include a stator core 102 and a rotor 106. As mentioned above, electrified vehicles may include more than one electric machine. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. A shaft 112 may be operably connected to the rotor 106 and may be coupled to other vehicle components to transfer mechanical power therefrom.

Windings 120 may be disposed within the cavity 110 of the stator core 102. In an electric machine motor example, current may be fed to the windings 120 to obtain a rotational force on the rotor 106. In an electric machine generator example, current generated in the windings 120 by a rotation of the rotor 106 may be used to power vehicle components. Portions of the windings 120, such as end windings 126, may protrude from the cavity 110. During operation of the electric machine 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 generates a rotating magnetic field. Magnets of the rotor 106 will magnetize and rotate with the rotating magnetic field to rotate the shaft 112 for mechanical power.

Figure 3:
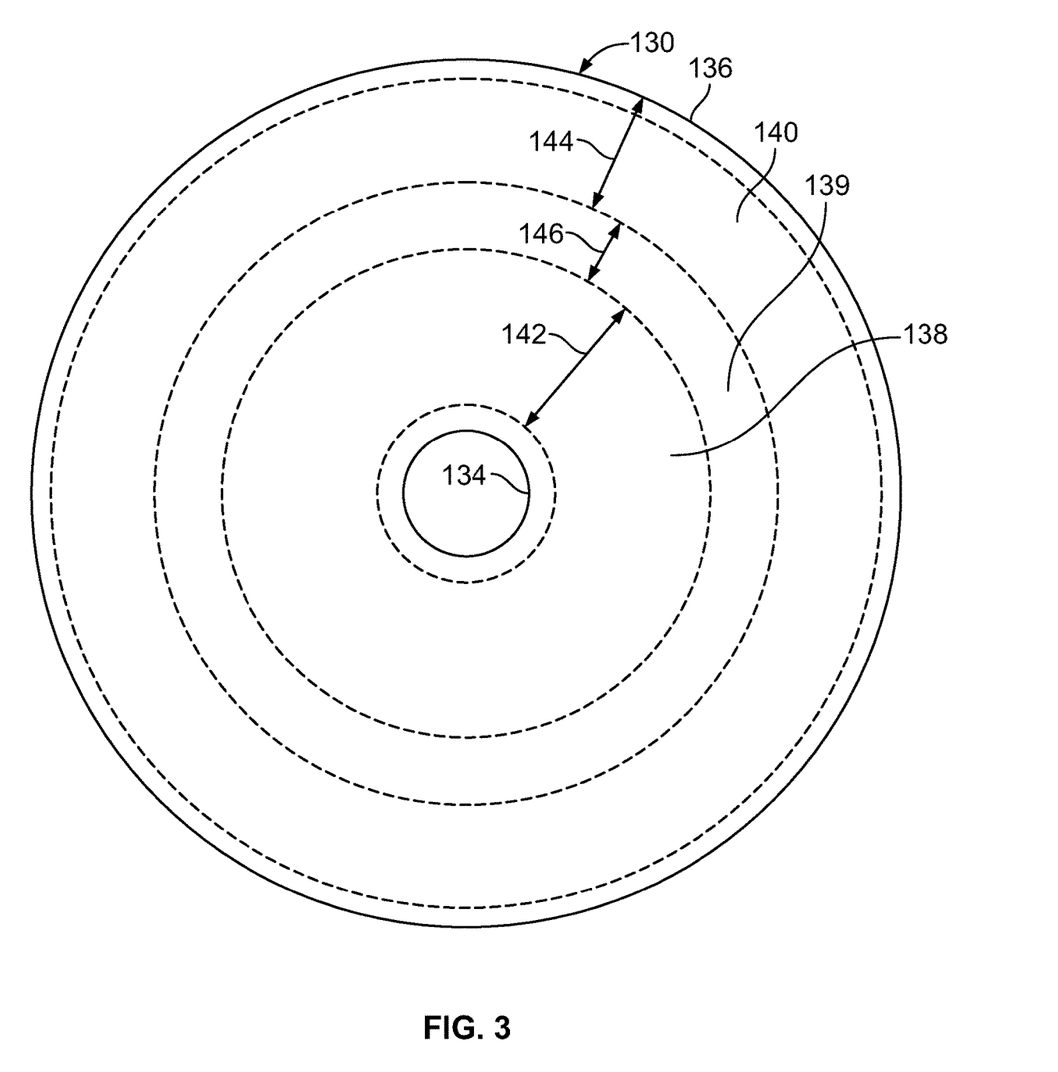
FIG. 3 is a front view, in cross-section, of an example of a rotor illustrating different rotor regions.

FIG. 3 shows an example of a rotor of a vehicle electric machine, referred to as a rotor 130. The rotor 130 includes a central through-hole 134 sized to receive a shaft (not shown), such as the shaft 112 described above, and an outer surface 136. The rotor 130 further includes an inner region 138, a middle region 139, and an outer region 140.

The inner region 138 is located adjacent the central through-hole 134 and extends radially thereabout. The inner region 138 defines a radial length 142. An inner edge of the inner region 138 may be spaced from the central through-hole 134. The outer region 140 is located adjacent the outer surface 136 and extends radially about the central through-hole 134, the inner region 138, and the middle region 139. The outer region 140 defines a radial length 144. The middle region 139 defines a radial length 146. Openings or cutouts within the regions may provide locations for mounting components and also provide reduced weight benefits. The size and location of these openings or cutouts may also influence a stiffness of the rotor 130.

Typical rotor designs do not include a truss structure at an inner region and may have strain energy values of between 16,900 Joules and 19,000 Joules for a rotor having a mass of 6.35 kilograms. Strain energy is energy stored by a system undergoing deformation and an indicator of compliance of a structure. A higher strain energy typically reflects higher structural compliance. Compliance may be defined as an inverse structural stiffness. A lower compliance typically reflects a higher stiffness. Rotor structures including a truss structure may be stiffer than typical designs. The higher stiffness assists in reducing rotor stress during rotor operation and assists in enhancing rotor durability during rotor operation. A higher stiffness may also assist in enabling rotor weight reduction.

Figure 4:
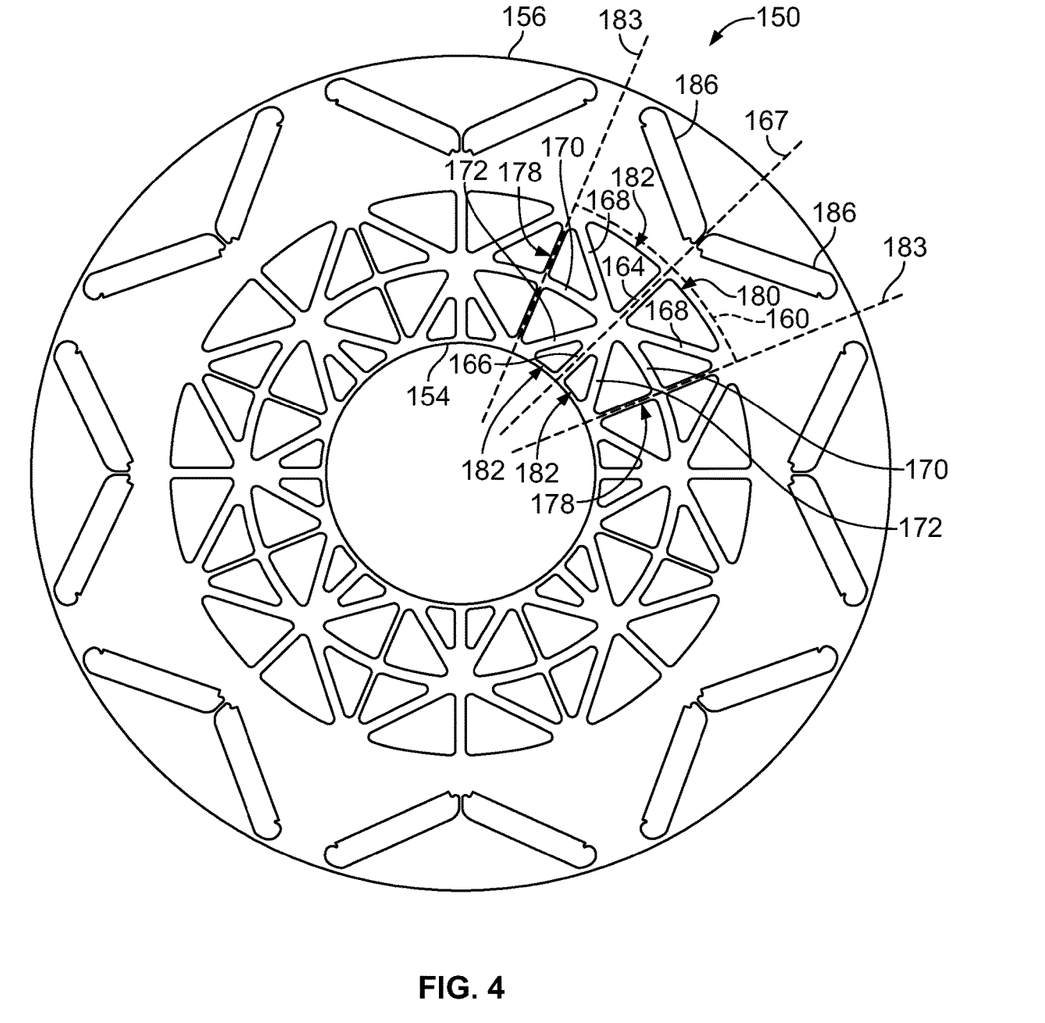
FIG. 4 is a front view, in cross-section, of an example of a rotor for an electric machine.
Figure 5:
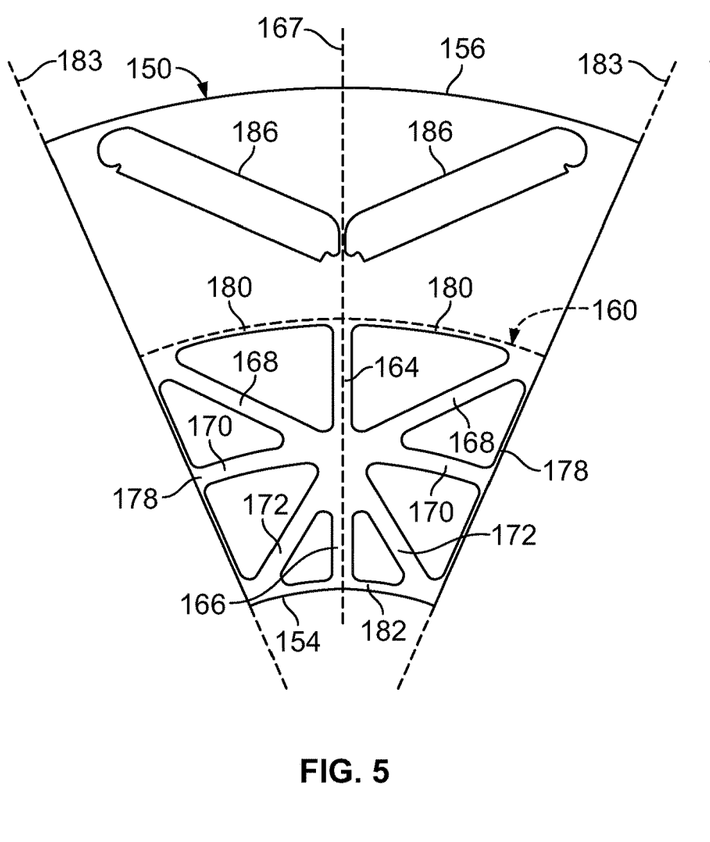
FIG. 5 is a front view, in cross-section, of a portion of the rotor of FIG. 4.

FIGS. 4 and 5 show another example of a rotor for a vehicle electric machine, referred to as a rotor 150. The rotor 150 includes a central through-hole 154 and an outer surface 156. The rotor 150 includes a truss structure 160 in an inner region. A plurality of truss structures 160 may be disposed radially about the central through-hole 154 and within the inner region. The rotor 150 is shown with eight truss structures 160 in FIG. 4. The truss structures 160 may reduce a weight of the rotor 150 by twenty percent in comparison to an embodiment in which the rotor 150 does not have the truss structures 160. The truss structures 160 may provide this weight reduction while also increasing overall structural stiffness by twenty percent in comparison to an embodiment in which the rotor 150 does not have the truss structures 160. In one example, the truss structures 160 of the rotor 150 having a mass of 6.35 kilograms may assist in generating a strain energy of the rotor 150 of 16,100 Joules. The strain energy value of 16,100 Joules represents a stiffness increase of 4% to 15% in comparison to typical rotors having a strain energy value of 16,000 Joules to 19,000 Joules.

Each of the truss structures 160 may include a first central member 164 and a second central member 166. Each of the first central members 164 and the second central members 166 may extend along a central axis 167 from the central through-hole 154. Each of the truss structures 160 may be arranged upon the rotor 150 such that current may flow along the central axes 167 to assist in controlling torque when the rotor 150 is operating. Each of the truss structures 160 further includes a pair of third members 168, a pair of fourth members 170, a pair of fifth members 172, a pair of side members 178, a lower member 180, and an upper member 182. Each of the pair of side members 178 defines an axis 183. Each of the axes 183 represent a path for magnetic flux to travel from the rotor 150 to a stator (not shown).

The members may be arranged with one another to define substantially triangular-shaped openings of the rotor 150. For example, each of the truss structures 160 may define eight triangular-shaped openings. The members may be arranged with one another so that an end of each of the members meets in a central region of the truss structure 160 between the triangular-shaped openings to form a starburst pattern emanating from the central region. For example, the triangular-shaped openings may be tessellated about respective central regions to form the respective truss structure 160. These openings are arranged upon the rotor 150 to reduce a weight of the rotor 150 in comparison to a solid embodiment of the rotor 150. Each of the truss structures 160 may define a radial length based on a size of the rotor 150, a size of the triangular-shaped openings, and a size of the truss structure members. In one example, the truss structure 160 may define a radial length approximately one quarter of a radius of the rotor 150, such as a radial length of between fifty millimeters and sixty millimeters.

Each of the truss structures 160 may include first and second symmetrical regions. Each of the symmetrical regions may include a portion of the first central member 164 and the second central member 166, one of the pair of third members 168, one of the pair of fourth members 170, one of the pair of fifth members 172, one of the pair of side members 178, a portion of the upper member 182, and a portion of the lower member 180.

Each of the third members 168, a portion of the upper member 182, and a portion of the first central member 164 may define a first triangular opening. Each of the third members 168, one of the fourth members 170, and a portion of one of the side members 178 may define a second triangular opening. Each of the fourth members 170, one of the fifth members 172, and a portion of one of the side members 178 may define a third triangular opening. Each of the fifth members 172, a portion of the second central member 166, and a portion of the lower member 180 may define a fourth triangle opening.

Each of the third members 168 and the fifth members 172 may define a width of between three and seven millimeters in an embodiment in which the rotor 150 defines a diameter of between one hundred ten millimeters and two hundred thirty millimeters. Each of the side members 178 may define a width of between 1.5 and 3.5 millimeters. Each of the first central member 164, the second central member 166, the pair of third members 168, the pair of fourth members 170, the pair of fifth members 172, and the pair of side members 178 may define a length between five and twenty millimeters.

An outer region of the rotor 150 may include a pair of cutouts 186 each sized to receive a magnet. Each of the pair of cutouts 186 may be oriented with one another to define a V shape. An apex of the V shape may point toward the central through-hole 154. Each of the pair of cutouts 186 is located adjacent the outer surface 156. An edge of one of the pair of cutouts 186 may be oriented parallel with an edge of one of the members of the truss structures 160. Magnets positioned in each of the pair of cutouts 186 generate magnetic flux during rotor 150 operation. The openings may be arranged upon the rotor 150 such that electromagnetic properties of the rotor 150 are not influenced. For example, the inner region and the outer region of the rotor 150 may be arranged with one another such that a middle region defines a radial length of substantially twenty-six millimeters. This radial length provides a spacing between the truss structure 60 and magnets which may be located within the cutouts 186 such that electromagnetic properties of the magnets are not influenced while the rotor 150 is rotating.

The rotor 150 may include a plurality sectors located about the central through-hole 154. For example, each sector may be defined by the axes 183, a portion of an edge of the central through-hole 154, and a portion of the outer surface 156. Each sector may be bisected by one of the central axes 167 and include no more than two of the cutouts 186 to receive two magnets oriented in a V shape relative to one another. Each sector may include one of the truss structures 160.

Figure 6:
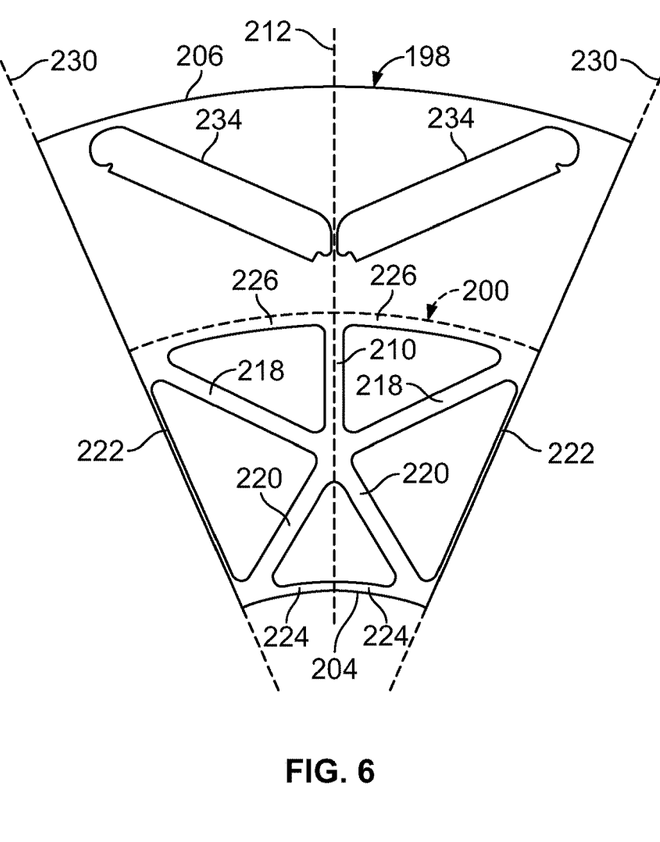
FIG. 6 is a front view, in cross-section, of an example of a portion of a rotor for an electric machine.

FIG. 6 shows a portion of a rotor 198 with an example of a truss structure of an inner region, referred to as a truss structure 200. The rotor 198 includes a central through-hole 204 and an outer surface 206. A plurality of truss structures 200 may be disposed radially about the central through-hole 204 and within the inner region. FIG. 6 shows only one truss structure 200, however it is to be understood that a complete view of the rotor 198 would include a plurality of truss structures 200. The truss structures 200 of the rotor 198 may reduce a weight of the rotor 198 in comparison to a rotor having a solid structure, such as the rotor 130. The truss structures 200 may provide this weight reduction while increasing overall structural stiffness by twenty percent in comparison to an embodiment in which the rotor 198 does not have the truss structures 200.

Each of the truss structures 200 may include a central member 210. Each of the central members 210 may extend along a central axis 212 from the central through-hole 204. Each of the truss structures 200 may be arranged may be arranged upon the rotor 198 such that current may flow along the central axes 212 to assist in controlling torque when the rotor 198 is operating. Each of the truss structures 200 further includes a pair of second members 218, a pair of third members 220, a pair of side members 222, a lower member 224, and an upper member 226. Each of the pair of side members 222 defines an axis 230. Each of the axes 230 represent a path for magnetic flux to travel from the rotor 198 to a stator (not shown).

The members may be arranged with one another to define substantially triangular-shaped openings of the rotor 198. For example, each of the truss structures 200 may define five triangular-shaped openings. These openings are arranged upon the rotor 198 to reduce a weight of the rotor 198 in comparison to a solid embodiment of the rotor 198. Each of the truss structures 200 may define a radial length based on a size of the rotor 198, a size of the triangular-shaped openings, and a size of the truss structure members. In one example, the truss structure 200 may define a radial length approximately one quarter of a radius of the rotor 198.

Each of the truss structures 200 may include first and second symmetrical regions. Each of the symmetrical regions may include a portion of the central member 210, one of the pairs of second members 218, one of the pair of third members 220, one of the pair of side members 222, a portion of the lower member 224, and a portion of the upper member 226.

Each of the second members 218, a portion of the upper member 226, and a portion of the central member 210 may define a first triangular opening. Each of the second members 218, one of the third members 220, and one of the side members 222 may define a second triangular opening. The third members 220 and the lower member 224 may define a third triangular opening.

An outer region of the rotor 198 may include a pair of cutouts 234 each sized to receive a magnet. Each of the pair of cutouts 234 may be oriented with one another to define a V shape. An apex of the V shape may point toward the central through-hole 204. Each of the pair of cutouts 234 is located adjacent the outer surface 206. An edge of one of the pair of cutouts 234 may be oriented parallel with an edge of one of the members of the truss structures 200. The openings may be arranged upon the rotor 198 such that electromagnetic properties of the rotor 198 are not influenced. For example, a spacing between the truss structure 200 and magnets which may be located within the cutouts 234 may be such that electromagnetic properties of the magnets are not influenced while the rotor 198 is rotating.

Figure 7:
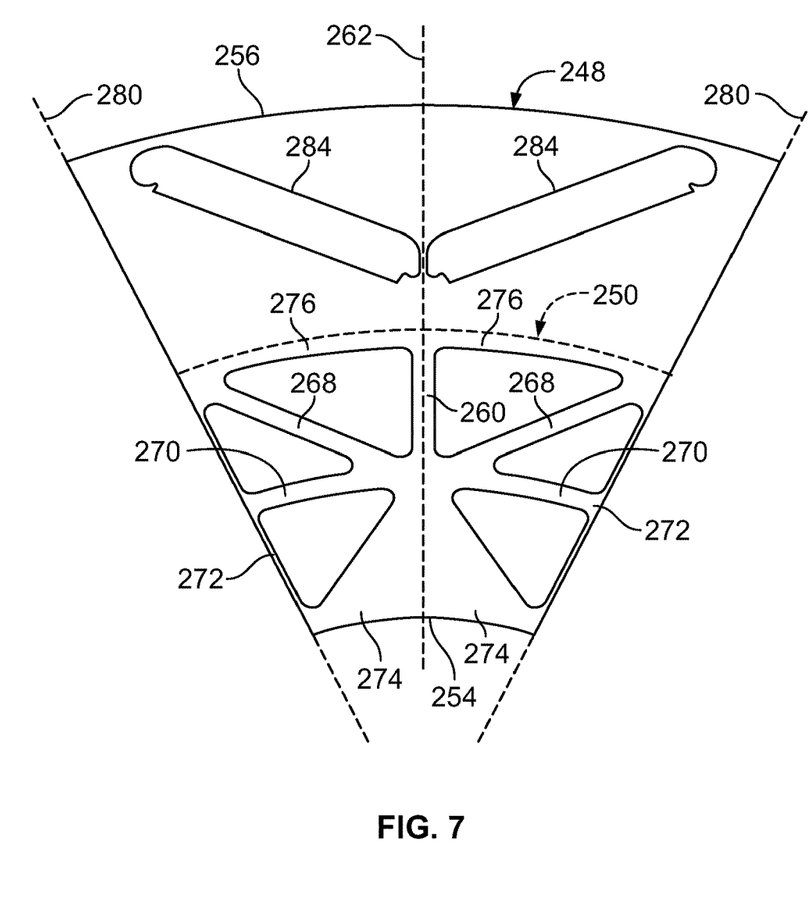
FIG. 7 is a front view, in cross-section, of an example of a portion of a rotor for an electric machine.

FIG. 7 shows a portion of a rotor 248 with another example of a truss structure of an inner region, referred to as a truss structure 250. The rotor 248 includes a central through-hole 254 and an outer surface 256. A plurality of truss structures 250 may be disposed radially about the central through-hole 254 and within the inner region. FIG. 7 shows only one truss structure 250, however it is to be understood that a complete view of the rotor 248 would include a plurality of truss structures 250. The truss structures 250 may provide weight reduction while increasing overall structural stiffness by twenty percent in comparison to an embodiment in which the rotor 248 does not have the truss structures 250.

Each of the truss structures 250 may include a central member 260. Each of the central members 260 may extend along a central axis 262 from the central through-hole 254. Each of the truss structures 250 may be arranged may be arranged upon the rotor 248 such that current may flow along the central axes 262 to assist in controlling torque when the rotor 248 is operating. Each of the truss structures 250 further includes a pair of second members 268, a pair of third members 270, a pair of side members 272, a lower member 274, and an upper member 276. Each of the pair of side members 272 defines an axis 280. Each of the axes 280 represent a path for magnetic flux to travel from the rotor 248 to a stator (not shown).

The members may be arranged with one another to define substantially triangular-shaped openings of the rotor 248. For example, each of the truss structures 250 may define six triangular-shaped openings. These openings are arranged upon the rotor 248 to reduce a weight of the rotor 248 in comparison to a solid embodiment of the rotor 248. Further, the openings are sized to provide reduced weight benefits while also increasing stiffness of the rotor 248. Each of the truss structures 250 may define a radial length based on a size of the rotor 248, a size of the triangular-shaped openings, and a size of the truss structure members.

Each of the truss structures 250 may include first and second symmetrical regions. Each of the symmetrical regions may include a portion of the central member 260, one of the pair of second members 268, one of the pair of third members 270, and one of the pair of side members 272.

Each of the second members 268, a portion of the upper member 276, and a portion of the central member 260 define a first triangular opening. Each of the second members 268, one of the third members 270, and a portion of one of the side members 272 may define a second triangular opening. Each of the third members 270, a portion of one of the side members 272, and a portion of the lower member 274 may define a third triangular opening.

An outer region of the rotor 248 may include a pair of cutouts 284 each sized to receive a magnet. Each of the pair of cutouts 284 may be oriented with one another to define a V shape. An apex of the V shape may point toward the central through-hole 254. Each of the pair of cutouts 284 is located adjacent the outer surface 256. An edge of one of the pair of cutouts 284 may be oriented parallel with an edge of one of the members of the truss structure 250.

Figure 8:
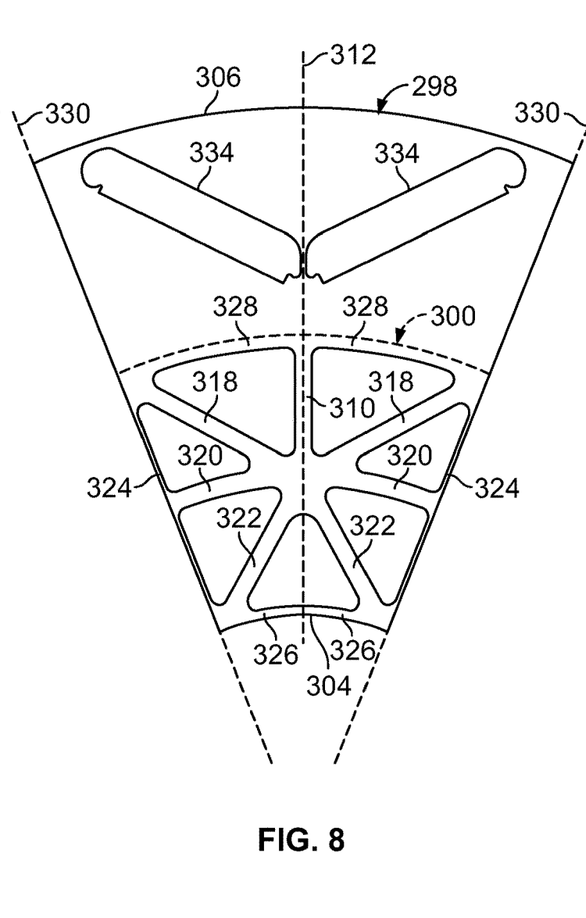
FIG. 8 is a front view, in cross-section, of an example of a portion of a rotor for an electric machine.

FIG. 8 shows a portion of a rotor 298 with another example of a truss structure of an inner region, referred to as a truss structure 300. The rotor 298 includes a central through-hole 304 and an outer surface 306. A plurality of truss structures 300 may be disposed radially about the central through-hole 304 and within the inner region. FIG. 8 shows only one truss structure 300, however it is to be understood that a complete view of the rotor 298 would include a plurality of truss structures 300. The truss structures 300 of the rotor 298 may reduce a weight of the rotor 298 in comparison to a rotor having a solid structure, such as the rotor 130. The truss structures 300 may provide this weight reduction while also providing a satisfactory stiffness factor.

Each of the truss structures 300 may include a central member 310. Each of the central members 310 may extend along a central axis 312 from the central through-hole 304. Each of the truss structures 300 may be arranged upon the rotor 298 such that current may flow along the central axes 312 to assist in controlling torque when the rotor 298 is operating. Each of the truss structures 300 further includes a pair of second members 318, a pair of third members 320, a pair of fourth members 322, a pair of side members 324, a lower member 326, and an upper member 328. Each of the pair of side members 324 defines an axis 330. Each of the axes 330 represent a path for magnetic flux to travel from the rotor 298 to a stator (not shown).

The members may be arranged with one another to define substantially triangular-shaped openings of the rotor 298. For example, each of the truss structures 300 may define eight triangular-shaped openings. These openings are arranged upon the rotor 298 to reduce a weight of the rotor 298 in comparison to a solid embodiment of the rotor 298. Each of the truss structures 300 may define a radial length based on a size of the rotor 298, a size of the triangular-shaped openings, and a size of the truss structure members.

Each of the truss structures 300 may include first and second symmetrical regions. Each of the symmetrical regions may include a portion of the central member 310, one of the pair of second members 318, one of the pair of third members 320, one of the pair of fourth members 322, one of the pair of side members 324, a portion of the lower member 326, and a portion of the upper member 328.

A portion of the central member 310, one of the pair of second members 318, and a portion of the upper member 328 may define a first triangular opening. One of the second members 318, one of the third members 320, and a portion of one of the side members 324 may define a second triangular opening. One of the third members 320, one of the fourth members 322, and a portion of one of the side members 324 may define a third triangular opening. The fourth members 322 and the lower member 326 may define a fourth triangular opening.

An outer region of the rotor 298 may include a pair of cutouts 334 each sized to receive a magnet. Each of the pair of cutouts 334 may be oriented with one another to define a V shape. An apex of the V shape may point toward the central through-hole 304. Each of the pair of cutouts 334 is located adjacent the outer surface 306. An edge of one of the pair of cutouts 334 may be oriented parallel with an edge of one of the members of the truss structure 300.

The openings may be arranged upon the rotor 298 such that electromagnetic properties of the rotor 298 are not influenced. For example, the inner region and the outer region may be arranged with one another such that a spacing between the truss structure 300 and magnets which may be located within the cutouts 334 assists in ensuring that electromagnetic properties of the magnets are not influenced while the rotor 298 is rotating.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery; and
an electric machine in operational communication with the traction battery and including a stator core defining a cavity and a rotor disposed within the cavity having an inner region defined by sets of triangle-shaped holes tessellated about respective central regions to form a truss structure such that the holes of the truss structure, wherein the truss structure includes pairs of symmetrical portions each including segments arranged with adjacent rotor portions to define the triangle-shaped holes, wherein the truss structure includes first and second symmetrical portions, each symmetrical portion sharing a first member and each symmetrical portion including second and third members, wherein the first member is arranged with each of the second members and an adjacent portion of the rotor to define first and second triangle-shaped holes, and wherein each of the second members is arranged with one of the third members and another adjacent portion of the rotor to define third and fourth triangle-shaped holes, and wherein during operational rotation, do not influence magnetic flux paths generated by magnets of the rotor.

2. The vehicle of claim 1, wherein the rotor has a strain energy value less than or equal to 16,100 Joules.

3. The vehicle of claim 1, wherein the triangle-shaped holes are arranged with one another so that a strain energy of the rotor is equal to or less than 16,100 Joules.

4. An electric machine assembly comprising:
a stator core defining a cavity; and
a rotor disposed within the cavity and including a plurality of sectors spaced radially about a rotor central through-hole, wherein each of the plurality of sectors includes no more than two magnet openings to receive magnets oriented in a V shape and a truss structure including a plurality of triangle-shaped holes defined by members each having an end at a central region of the triangle-shaped holes, wherein the truss structure includes first and second symmetrical portions, each symmetrical portion sharing a first member and each symmetrical portion including second and third members, wherein the first member is arranged with each of the second members and an adjacent portion of the rotor to define first and second triangle-shaped holes, and wherein each of the second members is arranged with one of the third members and another adjacent portion of the rotor to define third and fourth triangle-shaped holes.

5. The assembly of claim 4, wherein each of the third members and a base segment of one of the first and second symmetrical portions are arranged with one another to define a fifth triangle-shaped hole therebetween.

6. The assembly of claim 5, wherein the first member extends to the base segments of each of the first and second symmetrical portions to bisect the fifth triangle-shaped hole.

7. The assembly of claim 4, wherein the first member defines a central axis extending between a pair of magnets mounted within the two magnet openings.

8. An electric machine assembly comprising:
a stator core defining a cavity; and
a rotor disposed within the cavity and including an inner region having a truss structure and an outer region for mounting magnets thereto and spaced radially from the inner region, wherein the truss structure includes members defining openings arranged with one another such that the members form respective starburst patterns, wherein the truss structure includes first and second symmetrical portions, each symmetrical portion sharing a first segment and each symmetrical portion including a second segment and a third segment, wherein the first segment is arranged with each of the second segments and an adjacent portion of the rotor to define first and second triangle-shaped openings, and wherein each of the second segments and third segments are arranged with another adjacent portion of the rotor to define third and fourth triangle-shaped openings.

9. The assembly of claim 8, wherein the truss structure defines a radial length of approximately fifty-four millimeters.

10. The assembly of claim 8, wherein each of the third segments and a base portion of a respective symmetrical portion is arranged with one another to define a fifth triangle-shaped opening therebetween.

11. The assembly of claim 8, wherein the truss structure is sized such that the rotor has a strain energy value of approximately 16,000 Joules and a weight of approximately 6.35 kilograms.

* * * * *